Oct. 9, 1934.   W. CEDERHOLM ET AL   1,975,769
ANCHOR FOR BRICK, TILE, AND THE LIKE
Filed June 30, 1932   4 Sheets-Sheet 1
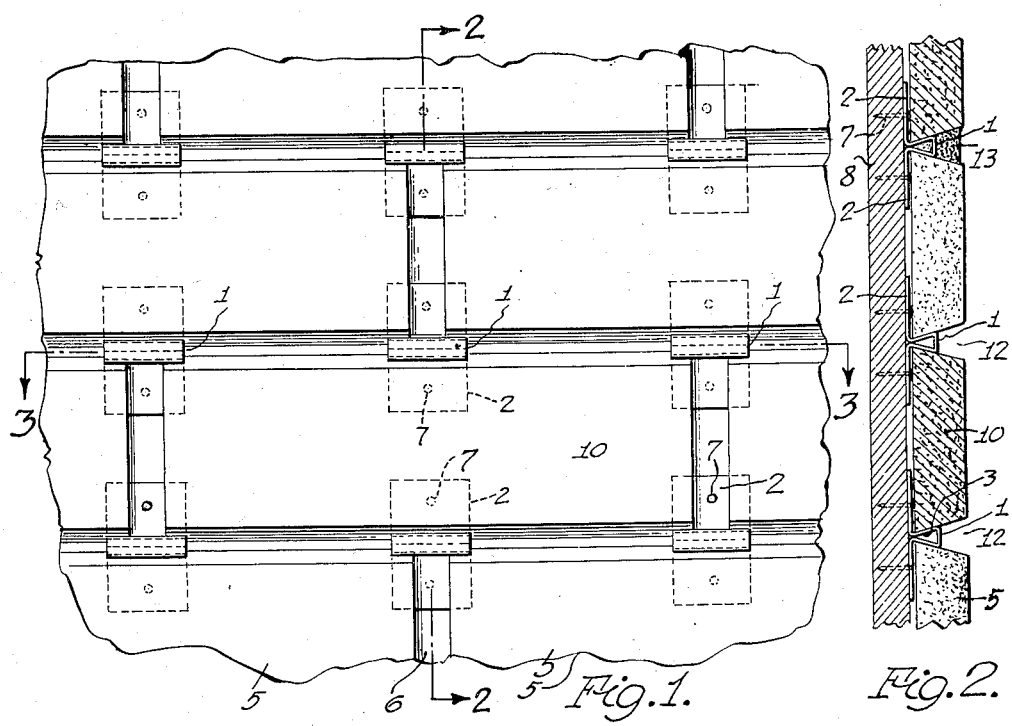
Fig.1.   Fig.2.
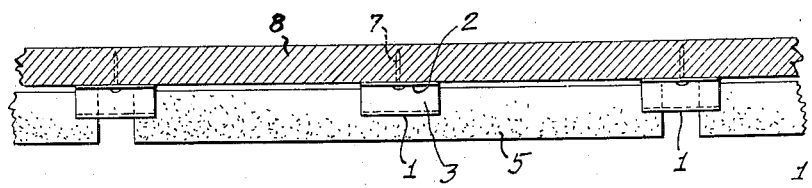
Fig.3.
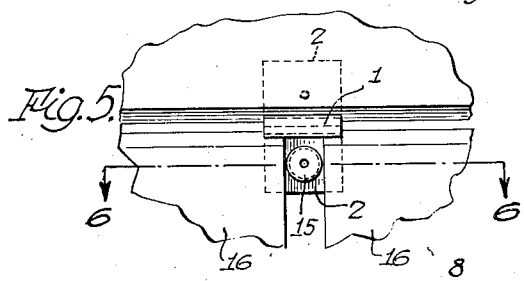
Fig.5.
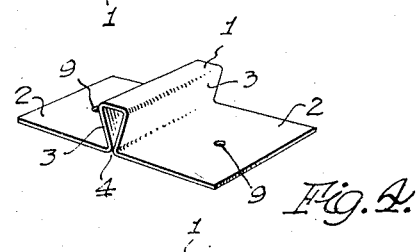
Fig.4.
Fig.7.
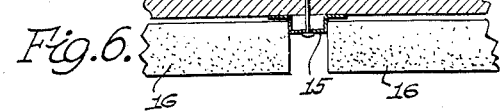
Fig.6.
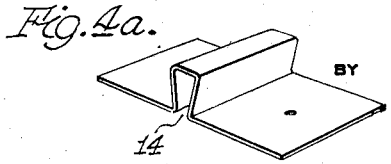
Fig.4a.
INVENTOR
William Cederholm,
Clarence G. Johnson,
BY
ATTORNEYS Oct. 9, 1934.   W. CEDERHOLM ET AL   1,975,769
ANCHOR FOR BRICK, TILE, AND THE LIKE
Filed June 30, 1932   4 Sheets-Sheet 2
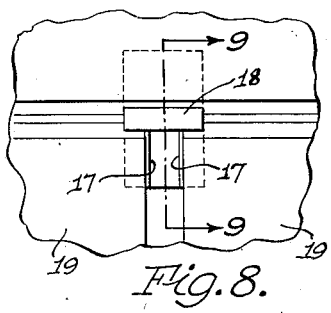
Fig.8.
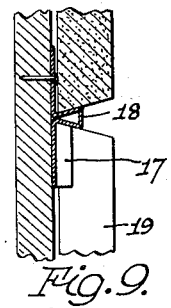
Fig.9.
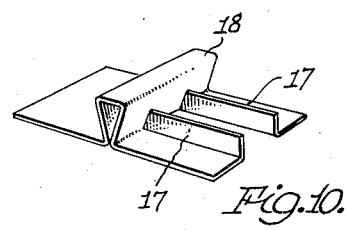
Fig.10.
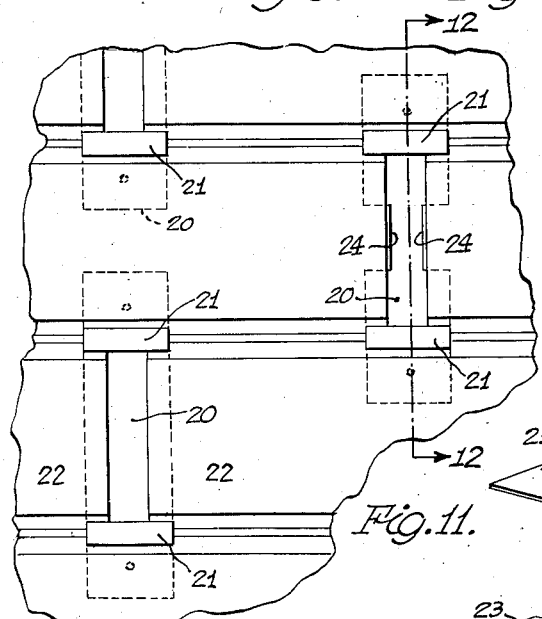
Fig.11.
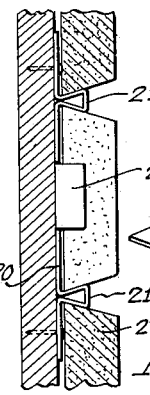
Fig.12.
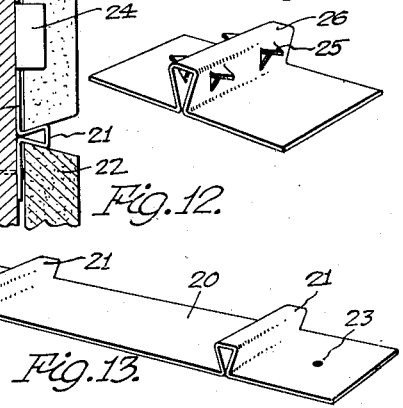
Fig.15.
Fig.13.
Fig.14.
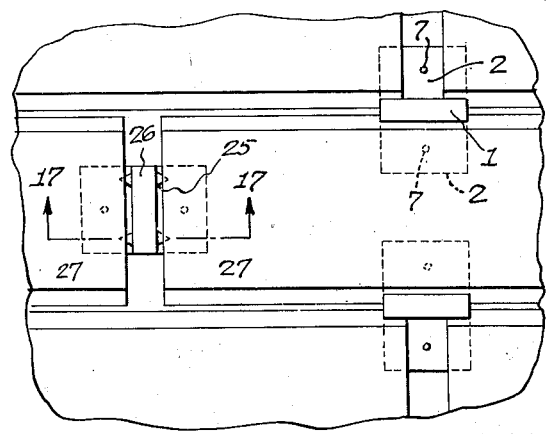
Fig.16.
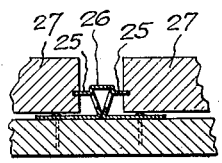
Fig.17.
INVENTOR
William Cederholm,
Clarence G. Johnson,
BY
ATTORNEYS

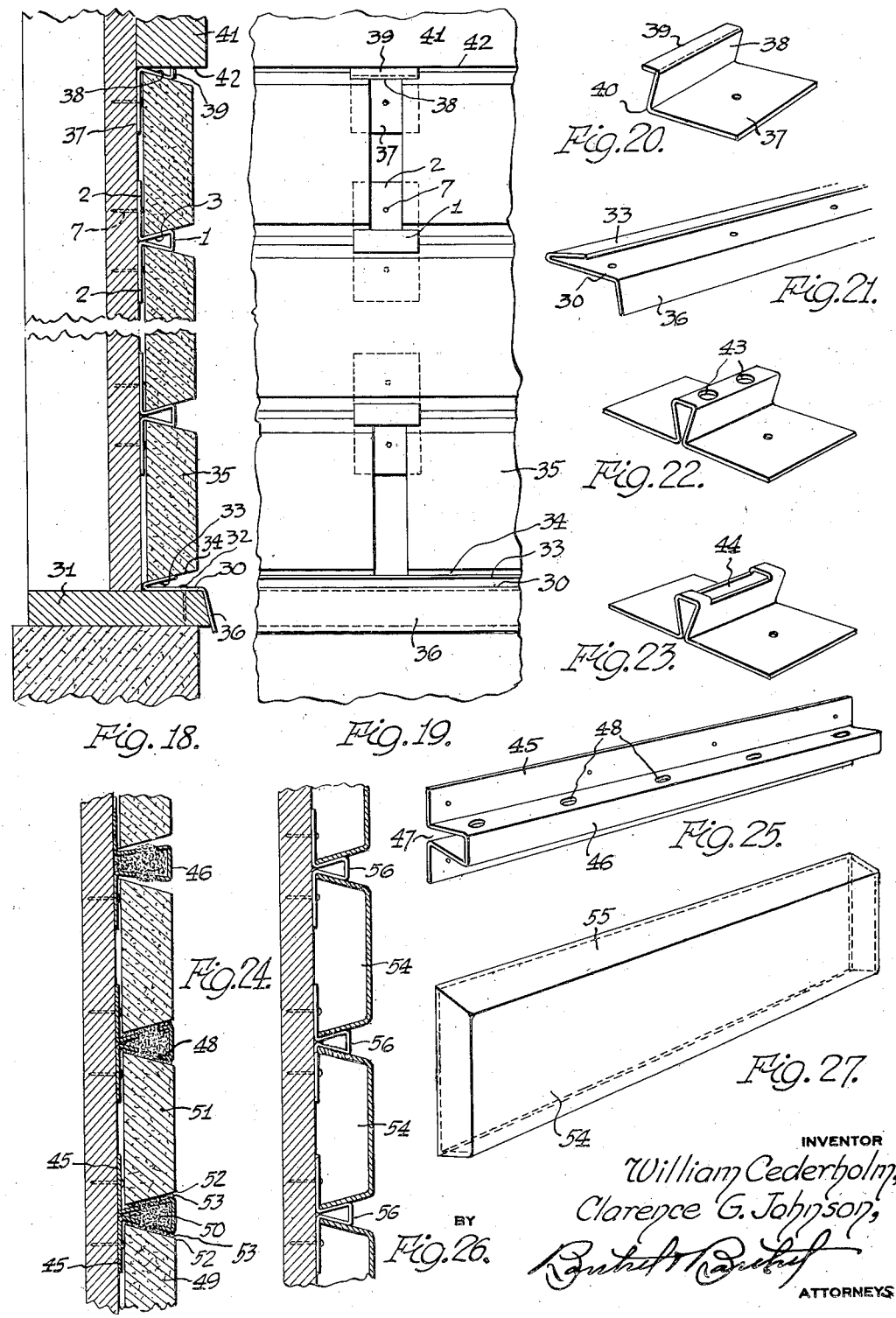

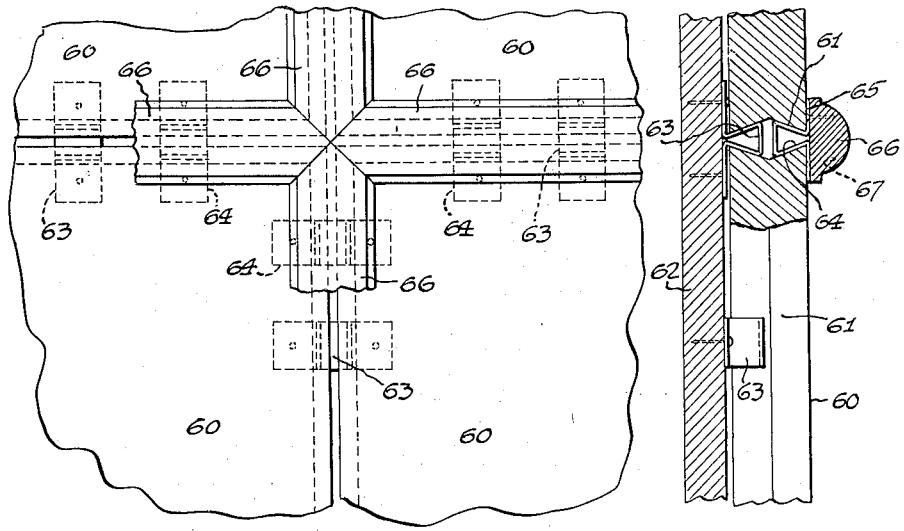
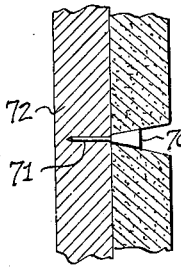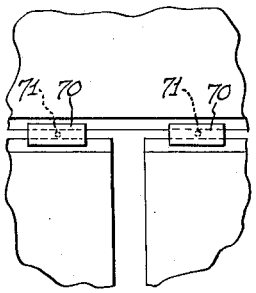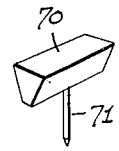
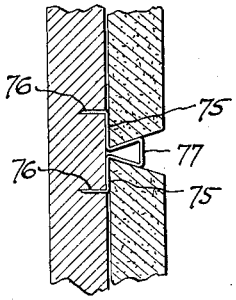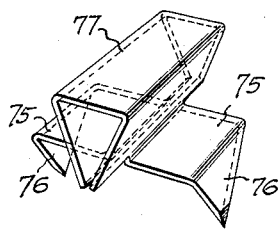

Patented Oct. 9, 1934

1,975,769

UNITED STATES PATENT OFFICE 1,975,769

ANCHOR FOR BRICK, TILE, AND THE LIKE

William Cederholm, Detroit, Mich., and Clarence G. Johnson, Hartford City, Ind.

Application June 30, 1932, Serial No. 620,150

13 Claims. (Cl. 72—19)

The present invention pertains to a novel fastening means for securing finishing material, such as brick, tile, panelling, or the like, to a base board or siding. Particularly, the device of the invention is adapted for the securing of thin members of this character and thereby enables the use of unusually thin brick for veneering a building. In this particular type of work, a considerable economy is effected in the wall thickness and the amount of brick material required.

One of the most important objects of the invention is to provide such a fastening means which serves as a spacer between courses or between the ends of adjacent bricks of a given course. In fact, the fastener may be so shaped as to determine the space both between courses and between adjacent bricks.

The invention is fully disclosed by way of example in the following description and in the accompanying drawings, in which Fig. 1 is an elevation of a wall structure according to one embodiment of the invention;

Figs. 2 and 3 are sections on lines 2—2 and 3—3 respectively of Fig. 1;

Fig. 4 is a perspective view of the fastening member employed in Figs. 1, 2 and 3;

Fig. 4a is a perspective view of a somewhat modified style of fastener;

Fig. 5 is a detail elevation of a wall structure embodying a modified form of fastener;

Fig. 6 is a section on the line 6—6 of Fig. 5;

Fig. 7 is a perspective view of the fastener used in Figs. 5 and 6;

Fig. 8 is a detail elevation of a wall structure embodying another form of fastener;

Fig. 9 is a section on the line 9—9 of Fig. 8;

Fig. 10 is a perspective view of the fastener of Figs. 8 and 9;

Fig. 11 is a detail elevation of the wall structure embodying other styles of fasteners;

Fig. 12 is a section on the line 12—12 of Fig. 11;

Figs. 13 and 14 are perspective views of the fasteners shown in Fig. 11;

Fig. 15 is a perspective view of still another type of fastener;

Fig. 16 is a detail elevation of the wall structure embodying the fastener of Fig. 15;

Fig. 17 is a section on the line 17—17 of Fig. 16;

Fig. 18 is a vertical section of a wall structure embodying a foundation or weather strip member and a special upper member;

Fig. 19 is an elevation of the same wall;

Fig. 20 is a perspective view of the special upper member;

Fig. 21 is a perspective view of the foundation or weather strip member;

Figs. 22 and 23 are perspective views showing still further modifications of the fastener;

Fig. 24 is a vertical section of a wall structure embodying another form of fastener and illustrating the method of erecting the wall;

Fig. 25 is a perspective view of a fastener used in Fig. 24;

Fig. 26 is a vertical section of a wall veneered with hollow tile;

Fig. 27 is a perspective view of one of the tile members used in Fig. 26;

Fig. 28 is a detail elevation of the wall of the structure having a trim applied to the joints in accordance with the invention;

Fig. 29 is a vertical section of the same wall;

Fig. 30 is a detail vertical section of a wall embodying still another form of fastener;

Fig. 31 is an elevation corresponding to Fig. 30;

Fig. 32 is a perspective view of the fastener used in Figs. 30 and 31;

Fig. 33 is a detail vertical section of a wall embodying another form of fastener, and Fig. 34 is a perspective view of said fastener.

Reference to these views will now be made by use of like characters which are employed to designate corresponding parts throughout.

The fastening element or anchor illustrated in Figs. 1 to 4 is a sheet metal member stamped or otherwise shaped to form a channel structure 1 between a pair of wings 2 lying in one plane. The back of the channel is parallel to the wings, and the sides 3 of the channel converge towards the plane of the wings, so that the mouth of the channel is substantially closed, as indicated by the numeral 4.

Assuming that the first course 5 of bricks has been laid, fasteners are applied to the upper edge of this course at selected points, as at the joint 6 and the midpoint of the upper edge of each brick. Each fastener may then be secured by driving a nail 7 through the upper wing thereof into the siding 8 and in this connection each wing has a nail hole 9, so that it is immaterial which wing is positioned uppermost. The joint 6, however, permits driving a nail also through the lower wing. Another course of bricks 10 is laid upon the first row of fasteners in any desired formation with respect to the first course 5, another row of fasteners 11 is assembled upon the course 10, and this process is continued until the wall is erected, as will be apparent to anyone skilled in the art.

The longitudinal edges of the bricks diverge toward the base thereof at the angle defined by the wedge-shaped rib or channel 1, whereby each brick is locked between the fasteners at its upper and lower edges, as illustrated in Fig. 2, so that it is held from falling away from the siding. The spaces 12 between the courses may be pointed with mortar 13 in the usual manner; likewise the joints may be filled with mortar. Where the width of the bricks is accurate and uniform, the upper and lower fasteners of a given course may be nailed at both wings to the siding before application of the bricks and the bricks then inserted endwise between the fastenings.

It will be seen that the brick members are of less than usual thickness in proportion to their length and breadth, and since they may be readily erected by the means and in the manner described herein, a great economy is effected in brick veneer work. These members, however, are merely illustrative of any form of surfacing elements, such as tile, briquettes, panels and the like.

In the modification shown in Fig. 4a the mouth of the channel is left open as indicated by the numeral 14. This construction imparts resiliency to the device, which permits tamping of the bricks for highly accurate spacing without breaking them, and further compensates for shrinking and swelling in changing weather conditions.

In the modification illustrated in Figs. 5, 6, and 7, one of the wings has a boss or button 15 struck up therefrom and of a width equal to the desired vertical joint between the bricks of a given course. Thus, in laying the course, the ends of adjacent bricks 16 are brought into contact with diametrically opposed points of the bosses and are thereby accurately spaced without special effort or skill on the part of the workman.

As a further embodiment of the same principle the wing at the vertical joint may have spaced and parallel flanges 17 struck up therefrom and extending at right angles to the channel or rib 18 which determines the vertical spacing between courses. The ends of the adjacent bricks 19 of a given course are brought to bear against the respective outer faces of the flanges 17, as shown in Figs. 8 and 9, with the results already described in connection with Figs. 5, 6, and 7.

A multiple fastening element for determining the spacing between two or more courses is shown in Figs. 11 to 14, and consists of a blank 20 from which are struck out two or more parallel ribs or channels 21 of the nature already described. The ends of the adjacent bricks 22 of a given course are inserted between adjacent ribs 21 after the fastener has been secured to the siding by driving nails through holes 23 provided in the ends of the blank 20.

In forming a vertical joint between the ribs 21, it is desirable to provide means for determining the spacing of the joint, and such means may consist of flanges 24 struck up from the blank 20 between the ribs 21 and at right angles thereto, as shown in Figs. 12 and 14. These flanges are utilized in the same manner as the flanges 17 of Figs. 8, 9, and 10.

Fig. 15 illustrates a modification of the elementary type of the single fastener, wherein prongs 25 are struck out of the sides of the rib or channel 26. This style of fastener is useful between the ends 27 of adjacent bricks, which are usually perpendicular to the spaces thereof, as shown in Figs. 16 and 17, in which case the bricks extend into these ends to hold them. Also, this member may be used where the longitudinal edges of the bricks happen to be perpendicular or not properly inclined to the bases.

In Figs. 18, 19 and 21 is illustrated a foundation and weather strip member on which the first row of bricks is started. This member is a sheet metal length having a web 30 attached to the base board 31 by nails 32 and also formed at its rear edge with a forwardly and upwardly extending flange 33 to make surface contact with the lower inclined edge 34 of each brick 35 in the first course. At the forward edge of the web 30 is a downwardly extending flange 36 shaped to cover the face of the member 31 and thus drain off any water or moisture that may run down the wall. This flange is preferably hammered into shape to conform with the face of the base member 31 after it has been nailed to the latter. The wall or veneer is then erected from the first course by use of fastening elements in the manner already described.

The uppermost fasteners are similar to complete fasteners split in half lengthwise through the rib, as shown in Fig. 20, and thus consist each of a wing 37 to be inserted behind the top course, a side flange 38 inclined to engage and retain the upper edge of the top course and another flange 39 parallel to the wing 37 and of such height as to form a horizontal plane with the vertex 40 between the parts 37 and 38 when the wing is nailed to the siding, as shown in Fig. 18. The horizontal plane thus defined, constitutes a suitable support for a header or upper trim member 41 having a horizontal lower edge 42.

Figs. 22 and 23 illustrate openings through the top of the rib, such as two or more small holes 43 therethrough, as in Fig. 22 or an elongated slot 44 therethrough as in Fig. 23.

The mortar applied in the joints between courses may readily be squeezed through the openings to fill the ribs or channels, so that each mortar joint may be made continuous through the ribs of the fasteners therein. Another result of this construction is that the mortar is more securely attached to the fasteners and the entire veneer structure more securely attached to the siding.

In another embodiment of the invention as shown in Figs. 24 and 25, the fastener may be coextensive with the length of the brick or tile, and in this case consists of a stamping having side wings 45 and a hollow rib or channel 46 therebetween. In this construction it is preferred to provide an open mouth 47 for the channel and apertures 48 through the sides thereof. The sides are substantially perpendicular to the wing 45 in the initial form.

After laying the first course 49 a fastener is laid in alignment with the upper edge of one of the bricks therein and filled with mortar 50. A brick 51 for the next course is then laid over the fastening element and pushed or tamped downwardly. The mouth 47 is thereby closed so that the sides of the channel are brought to the angularity of the inclined edges 52 of adjacent bricks. At the same time, mortar is extruded through the apertures 48 and forms a joint 53 at the last named faces. The height of the rib is preferably equal to the thickness of the bricks or tile and suitably finished so that no further finishing or pointing operation is necessary at the joints. The uppermost fastener in Fig. 24 is shown in its initial position before being compressed by the weight of the next upper brick. In some cases the weight of the bricks is sufficient to compress the ribs without the application of additional pressure.

Figs. 26 and 27 illustrate the use of the invention in connection with surfacing members other than bricks. In this instance, these members consist of stamped metal bodies 54 which may be described as hollow metal tile. The longitudinal edges 55 of these members are inclined to be engaged and anchored by the intervening fasteners 56 in the manner already fully described in connection with Figs. 1 to 4.

Figs. 28 and 29 illustrate the use of the invention in connection with panelling or large tile. Each of the panel or tile members 60 has a V-groove 61 in its periphery. The members 60 are attached to a base or siding 62 by the use of fasteners 63 of the type already described, inserted in one half of the grooves of adjacent members. The other half of the grooves is occupied by a similar member 64 disposed oppositely to the member 63 so that its apertured wings 65 lie at the outer face of the tile or panel structure. A trim 66 is hammered against nails 67 in the wings 65. Thus, the panels or tile are fastened to the base 62 and their joints covered with outer trim without driving the nails into the members 60 or otherwise marring them. The members 60 thus may be used repeatedly and indefinitely in the formation of the panel designs. Also, panel or tile designs, such as mosaics may be assembled in a shop by the means disclosed herein and delivered to the point of installation and finally installed without the need of expert labor at the point of installation.

Still another style of fastener is illustrated in Figs. 30, 31 and 32 and consists of an elongated wedge shaped head 70 with a pointed shank 71 extending therefrom. These members are nailed into the siding 72 over a course of bricks before laying the next course, and the bricks of adjacent courses are retained by the engagement of the sloped sides of the heads 70 with the inclined longitudinal edges of the bricks as previously described.

The construction shown in Figs. 33 and 34 do not require separate members for attaching the fasteners to the siding, inasmuch as the wings 75 are formed with prongs 76 at the outer ends thereof and at right angles to the plane of the wings. In this construction the wings may be somewhat narrower than the intervening channel or rib 77, as clearly shown in Fig. 34. This device is installed by merely hammering the prongs 76 into the siding and at the same time positioning the rib 77 so that its sides will be properly engaged by the sloped edges of adjacent bricks in the manner already described.

It will now be evident that the device of the invention, in addition to special features mentioned throughout, enables the securing and accurate facing of thin brick, tile or similar members, without the use of skilled labor. Moreover such accurate spacing may be accomplished rapidly inasmuch as it is determined by the physical properties of the fasteners.

Although specific embodiments of the invention have been illustrated and described, it will be understood that various alterations in the details of construction may be made without departing from the scope of the invention, as indicated by the appended claims.

What we claim is:—

1. An anchor for brick, tile and the like, comprising a sheet metal member formed to provide a pair of wings in one plane and a struck-up rib between said wings, said rib having faces converging toward said plane, and additional spacing means standing outwardly from one of said wings.

2. An anchor for brick, tile and the like, comprising a sheet metal member formed to provide a pair of wings in one plane and a struck-up rib between said wings, said rib having faces converging toward said plane, and a spacing button struck-up from one of said wings.

3. An anchor for brick, tile and the like, comprising a sheet metal member formed to provide a pair of wings in one plane and a struck-up rib between said wings, said rib having faces converging toward said plane, and spacing flanges struck-up from one of said wings at a right angle to said rib.

4. An anchor for brick, tile and the like, comprising a sheet metal member formed to provide a pair of wings in one plane and a struck-up rib between said wings, said rib having faces converging toward said plane, and prongs struck out from said faces.

5. In a wall structure, a siding, finishing block members arranged in courses and having opposite edges converging toward said siding, anchor members secured to said siding between the converging edges of adjacent block members, each anchor member having a laterally apertured hollow rib projecting outwardly to the outer faces of said block members, and mortar filling said ribs and extruding through the apertures thereof into contact with said faces.

6. In a panel assembly, a siding, panels having V-shaped grooves in their edges, a fastening member having a rib fitted in a part of the grooves of adjacent panels and having a portion exposed at the outer faces of said panels, a trim member secured to said portion and covering the joint between said panels, and another fastener disposed in the remaining parts of said grooves and secured to said siding.

7. In a panel assembly, a siding, panels having V-shaped grooves in their edges, a fastening member having a rib fitted in a part of the grooves of adjacent panels and having a portion exposed at the outer faces of said panels, a trim member secured to said portion and covering the joint between said panels, and a similar fastening member fitted in the remaining parts of said grooves and secured to said siding.

8. In a panel assembly, a siding, panels having V-shaped grooves in their edges, a fastening member having a wedge-shaped rib fitted in a part of the grooves of adjacent panels and having a portion exposed at the outer faces of said panels, a trim member secured to said portion and covering the joint between said panels, and another fastener disposed in the remaining parts of said grooves and secured to said siding.

9. In a panel assembly, a siding, panels having V-shaped grooves in their edges, a fastening member having a wedge-shaped rib fitted in a part of the grooves of adjacent panels and having a portion exposed at the outer faces of said panels, a trim member secured to said portion and covering the joint between said panels, and a similar fastening member fitted in the remaining parts of said grooves and secured to said siding.

10. An anchor for brick, tile and the like, comprising a sheet metal member formed to provide a pair of wings in one plane and a struck-up rib between said wings, said rib having faces converging toward said plane, the free ends of said wings being sharpened and bent away from said rib.

11. An anchor for brick tile and the like comprising an attaching member, a wedge-shaped spacing member formed thereon, and additional spacing means formed on said attaching member and spaced perpendicularly from the first named spacing member.

12. An anchor for brick, tile and the like comprising an attaching member, a wedge-shaped spacing member formed thereon, and additional spacing means extending perpendicularly relative to said spacing member, said spacing means being mounted on said attaching member and being flexible relative thereto.

13. An anchor for brick, tile and the like, comprising an attaching member, a spacing member formed thereon, and adapted to engage the horizontal edges of bricks, and additional spacing means formed on said attaching member and adapted to engage the vertically extending edges of bricks.

WILLIAM CEDERHOLM.
CLARENCE G. JOHNSON.